Patented Oct. 4, 1932

1,880,322

UNITED STATES PATENT OFFICE

ALPHONS O. JAEGER, OF CRAFTON, PENNSYLVANIA, ASSIGNOR, BY MESNE ASSIGNMENTS, TO THE SELDEN RESEARCH & ENGINEERING CORPORATION, OF PITTSBURGH, PENNSYLVANIA, A CORPORATION OF DELAWARE

PRODUCTION OF NON-ACIDIC CARBONYL COMPOUNDS

No Drawing. Application filed August 23, 1928. Serial No. 301,693.

This invention relates to the production of non-acidic carbonyl compounds by the catalytic vapor phase oxidation of organic compounds, such as hydrocarbons, their derivatives and the like.

Organic compounds such as, for example, aromatic hydrocarbons like naphthalene, anthracene, benzene hydrocarbons and the like have been oxidized catalytically in the vapor phase to produce carbonyl compounds, some of which are acid as, for example, phthalic anhydride, which can be prepared by oxidizing naphthalene under suitable conditions, maleic acid, which can be prepared by the oxidation of benzol and other compounds, etc. Others are non-acidic, such as the quinones, for example, alphanaphthaquinone, anthraquinone, phenanthraquinone, fluorenone, acenaphthaquinone. Aldehydes may also be prepared in certain cases. Alkaline contact masses have proven in the main to be very unsatisfactory when acidic carbonyl compounds are to be prepared and it has previously been thought that alkaline contact masses could not be used satisfactorily for any organic oxidations. I have found that this general information which has so long been held is not correct and non-acidic carbonyl compounds can be most advantageously prepared by the use of alkaline contact masses. Thus, for example, when many non-alkaline contact masses, such as vanadium oxide, are used, it is almost impossible to get good yields of alphanaphthaquinone. When, however, an alkaline contact mass is used at suitable temperatures, satisfactory yields can be obtained. Similarly, excellent yields of anthraquinone can be obtained by the use of alkaline contact masses and particularly where the anthracene used as a raw material is not of a high grade of purity and may still contain considerable amounts of carbazole as an impurity, alkaline contact masses are particularly effective for they seem to have a selective activity in the decomposition of heterocyclic compounds to fixed gases and it is possible with suitable alkaline contact masses to oxidize anthracene containing an amount of carbazole which would preclude satisfactory operation of the non-alkaline contact masses, such as vanadium oxide.

Alkaline contact masses may be prepared in various ways and it should be understood that a contact mass does not actually have to have free hydroxyl ions in order to be alkaline. Thus, for example, many base exchange bodies are practically insoluble in water but are nevertheless alkaline compounds as they contain an excess of alkaline components.

The contact masses which may be used in the present invention may be prepared by the addition of alkali to ready formed contact masses or by the use of contact masses whose catalytically active component is itself an alkaline compound. Naturally, of course, the alkalinity of the contact mass may be obtained partly in one way and partly in the other.

In addition to the effectiveness of alkaline contact masses for the production of non-acidic carbonyl compounds from crude material containing heterocyclic compounds, it should be noticed that these contact masses are also very effective in increasing the purity of the product obtained where the reaction also tends to form acids. This is particularly true where relatively impure anthracene is oxidized. In such cases, considerable amounts of acidic substances are formed as by-products and these substances are to a large extent decomposed and normally burned to carbon dioxide, carbon monoxide, and water in the presence of alkaline contact masses. As a result, the products obtained are in most cases purer than when non-alkaline contact masses are used even where the latter would give fair results in the oxidation reaction itself. This feature of the present invention is of great importance as it permits the production of quinones and similar non-acidic carbonyl compounds in a relatively pure state with a minimum of acidic by-products and also permits the use of relatively less pure and hence, of course, cheaper raw materials. While the present invention is applicable to the catalytic production of all non-acidic carbonyl compounds, it is especially effective for the production of quinones as described above, to which may be added benzoquinone and bis-acenaphthylidenedione. The invention is, however, not restricted to the production of quinones but includes the production of aldehydes, for example, by oxidation of the side chains of the aromatic compounds, such as, for example, toluene and its homologues and substitution products or by the oxidation of aliphatic hydrocarbons or alcohols, for example the oxidation of methyl alcohol or methane to formaldehyde. In some cases the invention is also effective in the oxidation of secondary alcohols to ketones.

Most of the contact masses used in the present invention contain one or more alkali or alkaline earth metals. These contact masses are, therefore, stabilized as they contain compounds of the alkali forming metals which act as stabilizers, slowing up the reaction and prevent undue total combustion of the desired products. "Stabilizers" are compounds of metals falling within the group consisting of alkali metals, alkaline earth metals and earth metals whose oxides are not reducible with hydrogen, being so termed when used in conjunction with an organic oxidation catalyst because they exert a marked stabilizing action or slowing up of the tendency of the catalyst to produce complete combustion. The catalytic oxidation of organic compounds generally by means of stabilized catalysts are described in my prior Patent No. 1,709,853 dated April 23, 1929, of which the present application is in part a continuation. It should be understood, of course, that the earlier application includes non-alkaline as well as alkaline contact masses as it is not limited to the production of non-acidic carbonyl compounds. Some alkaline contact masses, of course, do not necessarily contain compounds of the alkali or alkaline earth metals although there are few such contact masses. They are, however, included in the present invention.

A very effective class of contact masses are those containing base exchange bodies, such as two-component zeolites or multicomponent zeolites or non-silicious base exchange bodies and their derivatives. These contact masses, due to the highly advantageous physical characteristics of the base exchange bodies, are among the most effective for the present invention. The catalytic oxidation of organic compounds by means of two-component zeolite contact masses is described in my prior Patent No. 1,694,122 dated December 4, 1928; the catalytic oxidation of organic compounds by means of non-silicious base exchange bodies is described in my prior Patent No. 1,735,763 dated November 12, 1929; and the catalytic oxidation of organic compounds by means of multicomponent zeolite contact masses is described and claimed in my prior Patent No. 1,722,297 dated July 30, 1929.

The present application is in part a continuation of these three prior applications, it being understood, of course, that the applications also include non-alkaline contact masses since they are not limited to the production of non-acidic carbonyl compounds. Any of the alkaline base exchange contact masses described in the above referred to applications may be used in the present invention with good effect. The catalytically effective elements which may be present in the contact masses of the present invention are very numerous and in general the same elements may be used as are described in the four prior applications above referred to of which the present application is in part a continuation. For many oxidations, particularly for the production of stable quinones, the metal elements of the fifth and sixth groups of the periodic system are very effective, particularly vanadium, molybdenum, tungsten, tantalum and uranium, and contact masses containing these elements may be considered as the preferred contact masses for the production of quinones and for the production of other non-acidic carbonyl compounds which are relatively stable. The invention, however, is in no sense limited to contact masses in which metal elements of the fifth and sixth groups of the periodic system are the only catalytically active components and other contact masses are very effective for certain reactions.

In many cases it is advantageous to suitably dilute the catalytically effective components so as to produce a smooth and uniform action. This can be effected by the use of various types of carriers on which the catalytically active material is coated or in the case of base exchange bodies they may be homogeneously diluted with suitable diluent material, for example finely divided material of high porosity, such as kieselguhr and the like. The product of such stabilized diluted contact masses is described in detatil in the applications above referred to and any of the methods herein set forth may be used in preparing diluted contact masses for the present invention.

A few typical contact masses will be described in the following specific examples which are illustrative of the invention but which do not limit its scope.

*Example 1*

200 parts of 33° Bé. potassium waterglass are diluted with 6–8 volumes of water and then a mixture of comminuted silicates and kieselguhr containing preferably more than 25% of kieselguhr is stirred into the waterglass. The amount added may vary within wide limits but in general the addition of diluent should not exceed an amount which leaves the suspension still easily stirrable. 18 parts of $V_2O_5$ are reduced to a blue vanadyl sulfate solution in a hot aqueous solution acidified with $H_2SO_4$, sulfur dioxide being employed as the reducing agent. The vanadyl sulfate obtained is transformed into a brown solution of potassium vanadite by treatment with sufficient 10 N. caustic potash solution. Finally, a 5–10% manganous sulfate solution is prepared. The waterglass suspension and vanadite solution are then poured together and the manganous sulfate solution added in a thin stream with vigorous agitation until the reaction mixture is neutral to phenolphthalein or just alkaline. The mass solidifies to a dirty gel, which is filtered with suction, washed three times with 100 volumes of water and dried. A contact mass consisting of a diluted three-component zeolite containing vanadium and manganese in non-exchangeable form is obtained. Instead of adding the diluents to the waterglass, they may, of course, be added to the vanadite solution or the waterglass and vanadite solutions may be mixed and the diluents then added. The resulting products are of similar character to those described above. It is also possible to substitute part or all of the vanadite by a corresponding amount of potassium vanadate or by other metallates of the fifth and sixth groups of the periodic system, such as potassium tungstate. The manganous sulfate solution may also be substituted partly or wholly by corresponding amounts of one or more of the following salts:—copper sulfate, nickel nitrate, cobalt sulfate, iron sulfate, aluminum sulfate, silver nitrate, etc. If desired, the three-component zeolite obtained after drying, preferably at 100° C., is hydrated by trickling water over it and then treated with salt solutions in order to introduce other metal oxides by base exchange. For example, iron, cobalt, silver, nickel, cerium or a mixture may be introduced by trickling 5–10% solutions of their salts over the zeolite.

The three-component zeolites, which are alkaline since they were prepared from the solution which is strongly alkaline to litmus, are calcined with air at 400° C. and can then be used for the catalytic oxidation of various grades of anthracene to high grade anthraquinone. For example, if a 90% pure anthracene uniformly vaporized with air in the ratio of 1:40 by weight is passed over the contact mass at 380–420° C. an anthraquinone is obtained which, without any further purification, analyzes from 99.9 to 100% pure anthraquinone by the Hoechst method.

The yields are from 80 to 90% of the theory and preferably the reaction should be carried out in converters which have excellent temperature control, for example tubular converters in which the catalyst tubes are surrounded by baths such as, for example, mercury alloy baths which have boiling points at or below reaction temperature. Converter tubes of a diameter from 3/4" to 1", filled with contact mass to the height of 8" to 16" and operated at a loading of 3–5 parts of anthracene per tube per hour are advantageous and permit obtaining excellent yields of pure anthraquinone.

Lower grades of anthracene may also be oxidized by the above contact mass. For example, anthracene from which large quantities of phenanthrene have been removed but which still contains phenanthrene and considerable amounts of carbazole may be effectively oxidized to high grade anthraquinone by means of the above contact mass. If the anthracene is not too impure, the anthraquinone is directly usable for dyestuff manufacture since the alkaline contact mass has a strong tendency to decompose carbazole, which is burned out together with the remaining phenanthrene and gives a very pure anthraquinone. In some cases it is possible to directly oxidize crude 30% anthracene to crude anthraquinone using somewhat lower loadings and larger amounts of air. Substantially all of the impurities are burned out and excellent yields of anthraquinone are obtained.

Various grades of semi-purified anthracene can be effectively used, for example products obtained by re-crystallization, washing or leaching processes, using commonly known solvents such as hydrocarbons of the benzene series, acetone, gasoline, and the like or orthodichlorbenzene or other chlorinated solvents, such as the residues from the chlorine purification of light oil. These semi-purified anthracenes containing from 20 to 35% carbazole can be directly oxidized to high grade anthraquinone in the presence of alkaline contact masses, such as that described above. Particularly good effects are obtained from anthracene purified from solvents such as the furane bodies, for example furfural as described in my prior patent No. 1,693,713 dated December 4, 1928, which remove most of the carbazole as well as the phenanthrene when oxidized with the alkaline contact mass described in the present example. This example clearly illustrates the great efficiency of the alkaline contact masses for the production of quinones from products such as anthracene where considerable amounts of heterocyclic impurities are present. This property of alkaline contact masses makes them of great economic importance in such reactions.

*Example 2*

A contact mass is prepared by dissolving 18.2 parts of $V_2O_5$ in 250 parts of a KOH solution containing 22.6 parts of 100% KOH. 18 parts of ferric sulfate with 18.8 parts of copper sulfate with 7 mols of water are dissolved in 300 parts of water with heating. The potassium vanadate solution is then poured into the hot ferric sulfate-copper sulfate solution with vigorous agitation and the precipitate formed is filtered with suction, washed free from the mother liquor and the cake then sludged with about 6 parts of KOH in 250 parts of water. The suspension is then sprayed onto 500 volumes of 8-10 mesh pumice and is then ready for use.

$MoO_3$ or $WO_3$ or a mixture may replace part or all of the $V_2O_5$ and the iron sulfate-copper sulfate solution may be replaced partly or wholly by salts of nickel, silver, copper, manganese, titanium, aluminum, tin, lead, bismuth or chromium and the amounts of the salt solution may be varied, producing various salts of the metal acids of the fifth and sixth groups of the periodic system. In some cases, it is desirable to provide for a 5-10% excess of metal oxide, such as $Fe_2O_3$, CuO, CoO, NiO and the like, which can be prepared by using a considerable excess of the corresponding salt solution and a corresponding excess of alkali in the vanadate solution. The KOH used in sludging up the cake may be replaced by other alkaline stabilizers, such as KCN, $K_2CO_3$, $Na_2CO_3$, $Ca(OH)_2$ $CaCO_3$, etc. In some cases it is also advantageous to use as stabilizers alkali metallates, such as aluminates, cadmiates or chromites, the amphoteric metal acting as a stabilizer promoter. Neutral salts of the alkali forming metals may also be used in addition to the alkaline stabilizer, care, however, being taken that the final contact mass is alkaline. Instead of using pumice fragments, other carriers may be used, such as fragments of quartz, quartz filter stones, sand stones, "Celite" brick fragments, or natural or artificial silicates, base exchange bodies, especially zeolites, made by wet or fusion methods. Diluted zeolites, particularly those diluted with materials rich in silica are especially effective. Metal granules, such as granules of aluminum, or metal alloys, such as ferrosilicon, ferrovanadium, ferrochrome and the like can also be used, especially when the surface has been roughened or etched.

The contact masses described in this example are filled into suitable converters and can be used for the production of various non-acidic carbonyl compounds, such as the oxidation of anthracene to anthraquinone; acenaphthene or acenaphthylene to acenaphthaquinone; fluorene or difluorenyl to fluorenone, phenanthrene to phenanthraquinone; and side chain aromatic hydrocarbons of the benzene series to aldehydes. For example, 75 to 85% anthracene is uniformly vaporized with air at the ratio of 1:40 and passed over the contact mass at 360-390° C. An anthraquinone is obtained containing 99.9-100% pure anthraquinone by the Hoechst method. The yields are about 75% of theory. A lower grade of anthracene, preferably freed from a large percentage of phenanthrene, obtained by treatment with phenanthrene solvents but containing large quantities of carbazole, can be similarly oxidized to a high grade anthraquinone with the same success. The other aromatic hydrocarbons referred to above may be oxidized to the corresponding aldehydes or quinones under similar reaction conditions.

*Example 3*

A contact mass is prepared from the following solutions:

(1) 18.2 parts of $V_2O_5$ are dissolved in 250 parts KOH solution containing 22.6 parts of 100% KOH.

(2) 27 parts of ferric sulfate are dissolved in 300 parts of water at 60° C.

(3) 47 parts of cobalt nitrate with 6 mols of water are dissolved in 200 parts of water and cobalt hydroxide is precipitated out with sufficient 5 N. KOH solution. The precipitate is filtered, washed free from the mother liquor and suspended in 300 parts of water which contains 6 parts of KOH. Solution (1) is poured into solution (2) with vigorous agitation and the iron vanadate precipitated is filtered with suction, washed free from the mother liquor until the wash water is colorless and then sludged with 250 parts of water, whereupon 28 parts of $K_2SO_4$ is dissolved in the suspension. To this suspension is then added suspension (4) and the mixture coated onto 700 volumes of 8 to 12 mesh pumice fragments. The product is then calcined at 400° C. and filled into the converter. 90% pure anthracene is uniformly vaporized with air in the ratio of 1:35-40 by weight and passed over the contact mass at 380-420° C. A practically chemically pure anthraquinone is obtained with good yields. The contact mass can also be used with various other grades of anthracene as described in the foregoing examples, a high grade anthraquinone being obtained. The composition of the vanadate suspension may be varied within wide limits. Thus, the amount of ferric sulfate may be varied or it may be replaced partly or wholly by various amounts of other salt solutions, such as salts of manganese, cobalt, nickel, copper, silver, magnesium, titanium, or a mixture. The $K_2SO_4$ in the suspension may also be varied within wide limits or replaced partly or wholly by other stabilizers, such as $KNO_3$, $KNO_2$ or a mixture. It is also possible to replace the cobalt oxide in suspension (3) partly or entirely by iron oxide, nickel oxide, copper oxide or cerium oxide, small amounts of aluminum oxide, titanium oxide, zirconium oxide, or a mixture being added, if desired. The amount of KOH in the suspension may also be varied within wide limits and it may be partly or wholly replaced by other alkaline compounds, such as KCN, $K_2CO_3$, NaOH, $Ca(OH)_2$, etc.; they may be used singly or in admixture.

Example 4

The following solutions are prepared:

(1) 22 parts of aluminum sulfate with 18 mols of water are dissolved in 150 parts of water and aluminum hydroxide is precipitated out with ammonia. The precipitate is washed with 150–200 parts of water.

(2) 12 parts of $V_2O_5$ are dissolved in 5 N. KOH solution containing 24 parts of 90% KOH, the solution being heated up to 90° C.

(3) 60 parts of "Celite" brick refuse are suspended in 250 parts of water and 8 parts of ferric sulfate is then added. Thereupon ferric hydroxide is precipitated by N/2 KOH. The aluminum hydroxide cake is added to the potassium vanadate solution with vigorous agitation, producing a milky paste which is then thoroughly kneaded into the impregnated "Celite" brick refuse and thoroughly mixed with 25 parts of 33° Bé. potassium waterglass. The material is then placed on a suction filter and washed with 100 parts of water and dried, preferably at temperatures below 100° C., whereupon the cake is broken into fragments and filled into a converter. A 78% anthracene obtained by recrystallization of crude anthracene from furfural is uniformly vaporized with air in the ratio of 1:35 and passed over the contact mass at 380–400° C. A practically chemically pure anthraquinone is obtained.

Example 5

14 parts of $V_2O_5$ are dissolved in 200 parts of water with sufficient potassium hydroxide to form potassium vanadate. 9.5 parts of sodium tungstate are dissolved in 35 parts of water and mixed with the potassium vanadate solution. Dilute hydrocloric acid is then added until the solution remains slightly alkaline to litmus; whereupon the solution is diluted with 600–700 parts of water and 70–75 parts of commercial waterglass solution diluted with an equal volume of water are added with vigorous agitation and the mixture heated up to 60–70° C. Thereupon dilute hydrochloric acid is added in small portions from time to time, care being taken that the reaction mixture remains distinctly alkaline. A gelatinous precipitate is obtained which is pressed free from the mother liquor, dried and hydrated in the usual manner. The product is a zeolite containing vanadium and tungsten and can be used directly as a contact mass for the oxidation of anthracene to anthraquinone under the reaction conditions described in the foregoing examples.

If 5% manganese chloride solution is trickled over the zeolite, part of the exchangeable alkali is replaced by manganese oxide and the resulting product is a suitable contact mass for the catalytic oxidation of anthracene as described in the foregoing examples. Diluents may be incorporated in the base exchange body as, for example, pumice meal, quartz meal, kieselguhr, etc., or heavy metal salts of the fifth and sixth groups of the periodic system, such as the vanadates or molybdates of copper, silver, manganese, iron, cobalt, nickel, etc.

Example 6

Ordinary commercial water softening zeolites are treated with 5–10% solutions of the heavy metals in order to replace part of the exchangeable alkali by the corresponding heavy metal oxide. After this treatment the product is acted upon by diluted potassium or ammonium vanadates which are permitted to trickle over it, followed by washing with water. The so-called salt-like body of the zeolite is obtained and is an excellent contact mass for the catalytic oxidation of anthracene to anthraquinone under reaction conditions described in the foregoing examples.

Example 7

18 parts of vanadium pentoxide are suspended in 300 parts of water acidulated with concentrated sulfuric acid and are then reduced with sulfur dioxide to the blue vanadyl sulfate in the usual manner. The solution is boiled and concentrated to 150 parts of water. 10 parts of aluminum oxide are transformed into potassium aluminate with a 5 N. KOH solution. One third of the vanadyl sulfate solution prepared as above is treated with 10 N. potassium hydroxide to transform it into the coffee brown potassium vanadite, which is then mixed with the potassium aluminate solution, and 100 parts of infusorial earth are stirred in. Thereupon the remaining two thirds of the vanadyl sulfate is stirred in with vigorous agitation. The final reaction product should remain alkaline to litmus. The product is pressed, dried, broken into fragments, hydrated and then digested for a considerable time with a 5% copper solution, exchanging part of the exchangeable alkali for copper oxide. Other copper salts or salt solutions or salts of other metals may be used. 90% anthracene is uniformly vaporized with air in the ratio of 1:35 by weight and passed over the above contact mass at 380–450° C. Practically pure anthraquinone is obtained with good yields.

In the claims the term "permutogenetic" covers base exchange bodies, silicious or non-silicious, and the salt-like bodies obtained by the reaction of these base exchange bodies with compounds the acid radicals of which are capable of reacting with the base exchange bodies to produce products which show most of the properties of salts. When used in the claims, the term "permutogenetic" will have no other meaning.

The term "stabilizer promoter" refers to non-specific, solid, vapor phase catalysts when used in conjunction with the specific catalysts employed in the present invention. The non-specific catalysts are termed "stabilizer promoters" because when used in conjunction with a specific catalyst and a stabilizer they extend the limit of the stabilizing action which can be obtained by the use of a stabilizer alone. These substances are incapable of definition in any other manner than by their action because they vary with the particular type of specific catalyst and with the reaction conditions used, but the following test can readily be applied to determine the presence of a stabilizer promoter in a given contact mass. If the contact mass contains a substance that is catalytically active, but that does not have specific catalytic activity for the reaction in which the contact mass is used, it contains a stabilizer promoter.

What is claimed as new is:

1. A method of oxidizing organic compounds to non-acidic carbonyl compounds, which comprises vaporizing the organic compounds, admixing with an oxygen containing gas, and passing them at reaction temperature over an alkaline contact mass which favors the oxidation of organic compounds to intermediate products and which contact mass contains at least one metal element selected from the fifth and sixth groups of the periodic system.

2. A method according to claim 1, in which the contact mass contains a stabilizer.

3. A method according to claim 1, in which the contact mass contains at least one permutogenetic body.

4. A method of oxidizing aromatic compounds to quinones, which comprises vaporizing the aromatic compounds, admixing with an oxygen containing gas, and passing them at reaction temperature over an alkaline contact mass which favors the oxidation of aromatic compounds to intermediate products and which contact mass contains at least one metal element selected from the fifth and sixth groups of the periodic system.

5. A method according to claim 4, in which the contact mass contains a stabilizer.

6. A method according to claim 4, in which the contact mass contains at least one permutogenetic body.

7. A method of oxidizing anthracene to anthraquinone, which comprises vaporizing the anthracene, admixing with an oxygen containing gas, and passing them at reaction temperature over an alkaline contact mass which favors the oxidation of anthracene to intermediate products and which contact mass contains at least one metal element selected from the fifth and sixth groups of the periodic system.

8. A method according to claim 7, in which the contact mass contains a stabilizer.

9. A method according to claim 7, in which the contact mass contains at least one permutogenetic body.

Signed at Pittsburgh, Pennsylvania, this 21st day of August, 1928.

ALPHONS O. JAEGER.